United States Patent
Hebrink et al.

(10) Patent No.: US 11,298,918 B2
(45) Date of Patent: Apr. 12, 2022

(54) VISIBLY TRANSPARENT BROADBAND INFRARED MIRROR FILMS HAVING FLUOROPOLYMERS AND 7:1:1:7:1:1 LAYER THICKNESS RATIO

(71) Applicant: 3M INNOVATIVE PROPERTIES COMPANY, St. Paul, MN (US)

(72) Inventors: Timothy J. Hebrink, Scandia, MN (US); Mark B. O'Neill, Stillwater, MN (US); Stephen J. Kuncio, St. Paul, MN (US); Edward J. Kivel, Stillwater, MN (US); Laurence R. Gilbert, Marine on St. Croix, MN (US); Tracey D. Sorensen, Woodbury, MN (US); Timothy J. Nevitt, Red Wing, MN (US); Stephen A. Johnson, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 368 days.

(21) Appl. No.: 16/335,189

(22) PCT Filed: Sep. 25, 2017

(86) PCT No.: PCT/US2017/053169
§ 371 (c)(1),
(2) Date: Mar. 20, 2019

(87) PCT Pub. No.: WO2018/063961
PCT Pub. Date: Apr. 5, 2018

(65) Prior Publication Data
US 2019/0369314 A1  Dec. 5, 2019

Related U.S. Application Data

(60) Provisional application No. 62/402,384, filed on Sep. 30, 2016.

(51) Int. Cl.
  B32B 17/06 (2006.01)
  G02B 5/08 (2006.01)
  G02B 5/28 (2006.01)

(52) U.S. Cl.
  CPC ............ B32B 17/06 (2013.01); G02B 5/0841 (2013.01); G02B 5/281 (2013.01); G02B 5/282 (2013.01)

(58) Field of Classification Search
  CPC ....... B32B 17/10779; B32B 7/02; B32B 7/04; B32B 7/12; B32B 7/322; B32B 17/06;
  (Continued)

(56) References Cited

U.S. PATENT DOCUMENTS 5,103,337 A  4/1992 Schrenk
5,360,659 A  11/1994 Arends
(Continued)

FOREIGN PATENT DOCUMENTS

CN  112848602 A  *  5/2021
JP  2010078714 A2  4/2010
(Continued)

OTHER PUBLICATIONS

Dyne on: "Fiuorothermoplastics THVP 2030G X", Feb. 9, 2002 (Feb. 9, 2002), XP055685310, URL:http://multimedia.3m.com/mws/media/6232960/thvp-2030g-x.pdf.
(Continued)

*Primary Examiner* — Ryan S Dunning
(74) *Attorney, Agent, or Firm* — Yufeng Dong

(57) ABSTRACT

Multilayer infrared (IR) reflecting films are provided. An optical repeating unit of the film include a plurality of optical polymeric layers arranged to reflect light by constructive and destructive interference. Optical layer A is a high refractive index polymeric layer, and optical layer B is a low refractive index isotropic polymeric layer containing fluoropolymers.
(Continued)

The film has an average reflectance of about 50% to about 100% in a near infrared wavelength range of about 850 nm to about 1850 nm, and an average transmission of about 70% to about 90% in a visible light range.

14 Claims, 5 Drawing Sheets

(58) Field of Classification Search
CPC ......... B32B 27/06; B32B 27/08; B32B 27/20; B32B 27/285; B32B 27/304; B32B 27/32; B32B 27/325; B32B 27/36; B32B 2250/05; B32B 2250/24; B32B 2250/42; B32B 2255/10; B32B 2255/26; B32B 2255/28; B32B 2270/00; B32B 2307/206; B32B 2307/402; B32B 2307/412; B32B 2307/416; B32B 2307/418; B32B 2307/42; B32B 2307/708; B32B 2307/732; B32B 2419/00; B32B 2605/006; G02B 5/0816–0841; G02B 5/208; G02B 5/281; G02B 5/282; G02B 5/285; G02B 5/287
See application file for complete search history.

(56) References Cited

U.S. PATENT DOCUMENTS

| 6,449,093 | B2 | 9/2002 | Hebrink |
| 6,667,095 | B2 | 12/2003 | Wheatley |
| 6,744,561 | B2 | 6/2004 | Condo |
| 6,783,349 | B2 | 8/2004 | Neavin |
| 6,927,900 | B2 | 8/2005 | Liu |
| 2004/0004778 | A1* | 1/2004 | Liu ................. B32B 17/10807 359/883 |
| 2005/0186408 | A1 | 8/2005 | Condo |
| 2005/0233123 | A1 | 10/2005 | Weber |
| 2006/0084780 | A1 | 4/2006 | Hebrink |
| 2011/0247686 | A1 | 10/2011 | Honeker |
| 2011/0249325 | A1 | 10/2011 | Zehentmaier |
| 2011/0255155 | A1 | 10/2011 | Hebrink |
| 2011/0262754 | A1 | 10/2011 | Zehentmaier |
| 2015/0064428 | A1* | 3/2015 | Matsuo ............ B32B 17/10761 428/212 |
| 2015/0285956 | A1 | 10/2015 | Schmidt |

FOREIGN PATENT DOCUMENTS

| WO | WO 9936808 A1 | 7/1999 |
| WO | WO 2005-066668 A1 | 7/2005 |
| WO | WO 2010-078289 | 7/2010 |
| WO | WO 2011-066047 A1 | 6/2011 |
| WO | WO 2015-002776 | 1/2015 |

OTHER PUBLICATIONS

Berreman, Optics in Stratified and Anisotropic Media: 4x4-Matrix Formulation, Journal of the Optical Society of America, Apr. 1972, vol. 62, No. 4, pp. 502-510.
Stallinga, Berreman 4x4 matrix method for reflective liquid crystal displays: Journal of Applied Physics, Mar. 15, 1999, vol. 85, No. 6, pp. 3023-3031.
International Search Report for PCT International Application No. PCT/US2017/053169, dated Jan. 3, 2018, 3 pages.

* cited by examiner

VISIBLY TRANSPARENT BROADBAND INFRARED MIRROR FILMS HAVING FLUOROPOLYMERS AND 7:1:1:7:1:1 LAYER THICKNESS RATIO

CROSS REFERENCE TO RELATED APPLICATIONS

This application is a national stage filing under 35 U.S.C. 371 of PCT/US2017/053169, filed Sep. 25, 2017, which claims the benefit of U.S. Application No. 62/402,384, filed Sep. 30, 2016, the disclosure of which is incorporated by reference in its/their entirety herein.

FIELD OF THE DISCLOSURE

This disclosure relates to multilayer infrared (IR) reflecting films that are visibly transparent, and methods of making and using the same.

BACKGROUND

The use of multilayer polymeric films to reflect light is known and is described, for example, in U.S. Pat. No. 6,667,095 (Wheatley et al.), U.S. Pat. No. 5,360,659 (Arends et al.), and U.S. Pat. No. 5,103,337 (Schrenk et al.). A multilayer film designed to reflect infrared light may also have higher order reflections in the visible region of the spectrum. These higher order reflections may be undesirable in many applications (e.g., window films). In order to design infrared reflective films that are capable of reflecting light in the infrared region, but do not reflect light over the visible region, the higher order reflections need to be suppressed.

SUMMARY

There is a desire to improve solar reflection for multilayer infrared (IR) reflecting films. Briefly, in one aspect, the present disclosure describes a multilayer infrared (IR) reflecting film. The film includes an optical repeating unit including a plurality of optical polymeric layers arranged to reflect light by constructive and destructive interference. The plurality of optical polymeric layers include optical layers A and B. The optical layer A is a high refractive index polymeric layer, and the optical layer B is a low refractive index isotropic polymeric layer including one or more fluoropolymers. In addition to optical layers, some embodiments of the present disclosure may have protective skin layers on one or both sides of the optical layer stack. The film has an average reflectance from about 50% to about 100% in a near infrared wavelength range of about 850 nm to about 1850 nm, and the film has an average transmission from about 70% to about 90% in a visible light range. In some cases, the optical layer A absorbs less than 1% light in an ultraviolet (UV) wavelength range of about 350 nm to about 400 nm.

In another aspect, the present disclosure describes a window having a major surface, and a multilayer infrared (IR) reflecting film is provided on the major surface. The film includes an optical repeating unit including a plurality of optical polymeric layers arranged to reflect light by constructive and destructive interference. The plurality of polymeric layers include optical layers A and B. The optical layer A is a high refractive index polymeric layer, and the optical layer B is a low refractive index isotropic polymeric layer including one or more fluoropolymers. The film has an average reflectance from about 50% to about 100% in a near infrared wavelength range of about 850 nm to about 1850 nm, and the film has an average transmission from about 70% to about 90% in a visible light range.

Various unexpected results and advantages are obtained in exemplary embodiments of the disclosure. One such advantage of exemplary embodiments of the present disclosure is that the multilayer IR reflecting films can exhibit superior optical properties (e.g., high IR light reflectance, and high visible light transmission) by utilizing fluoropolymer low refractive index polymers in combination with higher order harmonic suppressive optical designs.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

Figure 1:
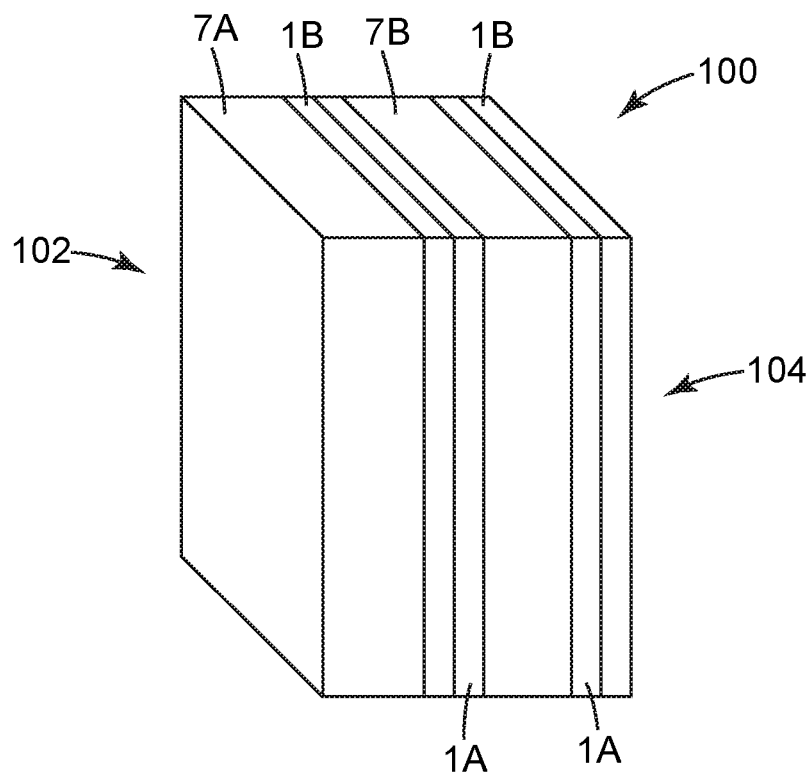
FIG. 1 shows a schematic illustration of a "711" layer construction for use in a multilayer IR reflecting film, according to one embodiment.

In the following description of the illustrated embodiments, reference is made to the accompanying drawings, in which is shown by way of illustration, various embodiments in which the disclosure may be practiced, it is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure provides multilayer infrared (IR) reflecting or mirror films that are visibly transparent. An optical repeating unit of the film includes a plurality of polymeric layers arranged to reflect light by constructive and destructive interference. The plurality of polymeric layers include optical layers A and B. The optical layer A is a high refractive index polymeric layer, and the optical layer B is a low refractive index isotropic polymeric layer including one or more fluoropolymers. The film has an average reflectance from about 50% to about 100% in a near infrared wavelength range of about 850 nm to about 1850 nm, and the film has an average transmission from about 70% to about 90% in a visible light range. In some cases, the film has low CIE (L*, a*, b*) color values with −5.0<a*<5.0 and −5.0<b*<5.0.

As used herein, the terms "reflective," "reflectivity," "reflection," "reflecting," or "reflectance" refer to total reflectance of a sufficiently specular nature.

The term "optical repeating unit" refers to a stack of optical layers arranged in a particular arrangement which is repeated across the thickness of a multilayer film.

The term "in-plane axes" refers to two mutually perpendicular axes disposed in the plane of the film. In the present application, these axes are typically designated as the x-axis and the y-axis.

The term "transverse axis" refers to an axis that is perpendicular to the plane of the film. In the present application, this axis is typically designated as the z-axis.

The term "birefringence" refers to the situation in which the index of refraction along the transverse axis $n_z$ is different from the index of refraction along one or both in-plane axes $n_x$ or $n_y$.

The term "isotropic" refers to the situation in which the indices of refraction along the x, y and z-axes are substantially the same (i.e., $n_x=n_y=n_z$).

Unless otherwise indicated, the terms "transparent" and "optically transparent" are used interchangeably and refer to an article, film, polymeric blend, or adhesive that has a high light transmittance (e.g., at least 70 percent such as at least 80 percent, at least 8.5 percent, at least 90 percent, at least 95 percent, at least 97 percent, at least 98 percent, or at least 99 percent) over at least a portion of the visible light spectrum (about 400 to about 700 nanometers (nm)). In many embodiments, the high transmittance is over the entire visible light spectrum.

As used herein, the term "polymer" refers to a polymeric material that is a homopolymer, copolymer, terpolymer, or the like. As used herein, the term "homopolymer" refers to a polymeric material that is the reaction product of a single monomer. As used herein, the term "copolymer" refers to a polymeric material that is the reaction product of two different monomers or polymer blends and the term "terpolymer" refers to a polymeric material that is the reaction product of three different monomers or polymer blends. It is to be understood that the terms "polymer" and "copolymer" in the present disclosure may include both random and block copolymers.

FIG. 1 is a schematic illustration of a 711 layer construction for use in a multilayer IR reflecting film, according to one embodiment. In FIG. 1, an optical repeating unit 100 in the multilayer IR reflecting film has six optical layers including alternating polymeric layers A and B arranged with layer thickness ratios of approximately 7A1B1A7B1A1B. The 711 layer construction can suppress the unwanted high order reflections (e.g., second, third, and fourth order reflections) in the visible wavelength region from about 400 to about 700 nm, while reflecting light in the infrared wavelength region from about 700 to about 2000 nm, preferably from about 850 to about 2000 nm.

In some embodiments, the optical polymeric layer A may be a birefringent layer and the optical polymeric layer B may be an isotropic layer, in some embodiments, the polymeric layer A may be an isotropic layer. The polymeric material of optical layer A has a first in-plane refractive index $n_1$. The optical polymeric layer B has a second in-plane refractive index $n_2$. In the present disclosure, the in-plane refractive index $n_1$ of optical layer A is greater than that of optical layer B $n_2$. In some embodiments, the first in-plane refractive index $n_1$ may be in the range of, for example, about 1.62 to about 1.68. In some embodiments, the second in-plane refractive index $n_2$ of optical layer B may be in a range of, for example, about 1.34 to about 1.40. In some embodiments, the in-plane refractive index difference between $n_1$ and $n_2$ can be, for example, at least 0.20, at least 0.22, at least 0.24, at least 0,26, at least 0.28, at least 0.30, or at least 0.32. In some embodiments, the difference between the first and second in-plane refractive indices $n_1$ and $n_2$ may be in the range of, for example, about 0.26 to about 0.32. In general, when the adjacent layers A and B have greater difference of refractive indices, the multilayer IR reflecting film may require fewer layers to achieve the desired optical power, e.g., IR light reflectivity.

A multilayer IR reflecting film may include multiple optical repeating units 100 of FIG. 1 that are stacked along the film thickness direction. In some embodiments, the multiple stacked optical repeating units 100 can be laminated to a substantially transparent substrate such as, for example, a polymer substrate, a glass substrate, etc. In some embodiments, one or more boundary polymeric layers can be provided for the optical repeating unit 100 onto faces 102 and/or 104 thereof. Exemplary boundary layers are described in U.S. Pat. No. 6,927,900 (Liu et al.), which is incorporated herein by reference.

The stacked optical repeating units 100 may not have the same optical thickness, but have a layer thickness gradient across the thickness of the film to achieve the desired band-width of reflection. The layer thickness gradient may vary widely depending on the intended application for the film. In some embodiments, the layer thickness gradient may be linear, in which the optical thickness of the optical repeating units increases at a constant rate across the thickness of the film. In this construction, each unit or unit cell is a certain amount thicker than the thickness of the previous unit in the multilayer stack. In some embodiments, each unit may be a certain percentage thicker than the thickness of the previous unit. The layer thickness may decrease, then increase, then decrease again from one major surface of the film to the other, or may have an alternate layer thickness distribution designed to increase the sharpness of one or both hand edges.

Preferred polymers for polymeric layer A may include suitable polyesters such as, for example, polyethylene terephthalate (PET). Polyethylene terephthalate (PET) can be made, for example, by reaction of terephthalic dicarboxylic acid with ethylene glycol. Its refractive index for polarized incident light of 550 nm wavelength increases when the plane of polarization is parallel to the stretch direction from about 1.57 to as high as about 1.69. Increasing molecular orientation increases the birefringence of PET. The molecular orientation may be increased by stretching the material to greater stretch ratios and holding other stretching conditions fixed. Copolymers of PET (CoPET), such as those described in U.S. Pat. No. 6,744,561 (Condo et al) and U.S. Pat. No. 6,449,093 (Hebrink et al.), the disclosures of which are incorporated herein by reference, are particularly useful for their relatively low temperature (typically less than 250° C.) processing capability making them more coextrusion compatible with less thermally stable second polymers. Other semicrystalline polyesters suitable as birefringent polymers may include, for example, polybutylene terephthalate (PBT), polyethylene terephthalate (PET), and/or copolymers thereof such as those described in U.S. Pat. No. 6,449,093 B2 (Hebrink et al) or U.S. Pat. Pub. No. 20060084780 (Hebrink et al.), the disclosures of are incorporated herein by reference.

Polyesters suitable for use in some exemplary multilayer optical films constructed according to the present disclosure may generally include carboxylate and glycol subunits. Suitable polyesters can be generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules. Also included within the ter "polyester" are polycarbortates derived from the reaction of glycol monomer molecules with esters of carbonic acid.

Suitable carboxylate monomer molecules for use in forming the carboxylate subunits of the polyester layers include, for example, 1,4-terephthalate dicarboxylic acid and isomers thereof; terephthalic acid; isophthalic acid; phthalic acid; azelaic acid; adipic acid; sebacic acid; norbornene dicarboxylic acid; bi-cyclo-octane dicarboxylic acid; 1,4-cyclohexane dicarboxylic acid and isomers thereof; t-butyl isophthalic acid, trimellitic acid, sodium sulfonated isophthalic acid; 4,4'-biphenyl dicarboxylie acid and isomers thereof; and lower alkyl esters of these acids, such as methyl or ethyl esters. The term "lower alkyl" refers, in this context, to C1-C10 straight-chained or branched alkyl groups.

Suitable glycol monomer molecules for use in forming glycol subunits of the polyester layers include ethylene glycol; propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; norbornanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis (2-hydroxyethoxy)benzene.

In some embodiments, the optical layer A may include an isotropic polymer. Exemplary isotropic optical polymers, especially for use in the optical layer A, may include homopolymers of polymethylmethacrylate (PMMA), such as those available from Ineos Acrylics, Inc., Wilmington, Del., under the trade designations "CP71" and "CP80;" and polyethyl methacrylate (PEMA), which has a lower glass transition temperature than PMMA. Additional useful polymers include copolymers of PMMA (CoPMMA), such as a CoPMMA made from 75 wt. % methylmethacrylate (MMA) monomers and 25 wt. % ethyl acrylate (EA) monomers, (available from Ineos Acrylics, Inc., under the trade designation "PERSPEX CP63" or Arkoma, Philadelphia, Pa., under the trade designation "ATOGLAS 510"), a CoPMMA formed with MMA comonomer units and n-butyl methacrylate (nBMA) comonomer units, or a blend of PMMA and poly(vinylidene fluoride) (PVDF). Additional exemplary optical polymers for Layer A include acrylate triblock copolymers, where each endblock of at least one of the first block copolymer, the second block copolymer, or the at least one additional block copolymer is comprised of poly(methyl methacrylate), and further wherein each midblock of at least one of the first block copolymer or the second block copolymer is comprised of poly(butyl acrylate). In some exemplary embodiments, at least one of the first block copolymer, the second block copolymer, or the at least one additional block copolymer is comprised of from 30 wt. % to 80 wt. % endblocks, and from 20 wt. % to 70 wt. % midblocks, based on a total weight of the respective block copolymer. In certain particular exemplary embodiments, at least one of the first block copolymer, the second block copolymer, or the at least one additional block copolymer is comprised of from 50 wt. % to 70 wt. % endblocks, and from 30 wt. % to 50 wt. % midblocks, based on the total weight of the respective block copolymer. In any of the foregoing exemplary embodiments, the first block copolymer may be selected to be the same as the second block copolymer. Triblock acrylate copolymers are available, for example, under the tradename Kurarity LA4285, available from Kuraray America Inc., Houston, Tex.

Additional suitable polymers for the optical layers, especially for use in the optical layer A, may include polyolefin copolymers such as poly (ethylene-co-octene) (PE-PO) available from Dow Elastomers, Midland, Mich., under the trade designation "ENGAGE 8200," poly (propylene-co-ethylene) (PPPE) available from Atofina Petrochemicals, Inc., Houston, Tex., under the trade designation "Z9470," and a copolymer of atactic polypropylene (aPP) and isotactic polypropylene (iPP). The multilayer optical films can also include, for example, in the second layers, a functionalized polyolefin, such as linear low density polyethylene-graft-maleic anhydride LLDPE-g-MA) such as that available from E.I. duPont de Nemours & Co., Inc., Wilmington, Del., under the trade designation "BYNEL 4105."

In the present disclosure, the materials for optical layer A do not absorb a significant amount of light in an ultraviolet (UV) range of about 350 nm to about 400 nm. The optical layer A may absorb, for example, less than 5%, less than 3%, less than 1%, or less than 0.5% of incident UV light. In some embodiments, the high refractive index polymeric layer A may not include crystalline or semi-crystalline polyethylenenaphthalate (PEN) and its isomers (e.g. 2,6-; 1,4-; 1,5-; 2,7; and 2,3-PEN). For example, the amount of PEN in the optical layer A may be lower than 5 mol %, lower than 1 mol %, lower than 0.5 mol %, lower than 0.2 mol %, lower than 0.1 mol %, or about 0 mol %. While PEN was claimed to have improvements in strength and chemical and hydrolytic resistance, gaseous barrier, thermal and thermo-oxidative resistance and ultraviolet (UV) light barrier resistance compared to PET, the present disclosure found that including a PEN layer as polymeric layer A in the IR reflective multilayer films described herein may introduce stability issues for potential UV degradation of the films.

Preferred polymers for optical layer B may have comonomer compositions including tetrafluoroethylene (TFE) and hexafluoropropylene (HFP). In some embodiments, the polymeric layer B may include about 30 mol % to about 80 mol % of tetrafluoroethylene (TFE), and about 20 mol % to about 70 mol % of hexafluoropropylene (HFP). In some embodiments, the layer B may include about 30 mol % to about 75 mol % of tetrafluoroethylene (TFE), about 5 mol % to about 30 mol % of hexafluoropropylene (HFP), about 0 to about 55 mol % of vinylidene fluoride (VDF), and about 0 to about 15 mol % of perfluoropropylvinyl ether (PPVE), in some embodiments, the optical polymeric layer B may include about 35 mol % to about 80 mol % of tetrafluoroethylene (TFE), about 5 mol % to about 50 mol % of hexafluoropropylene (HFP), and about 0 to about 15 mol % of perfluoropropylvinyl ether (PPVE).

The present description provides suitable comonomer compositions for polymeric layer B, in combination with the polyester layer A, to achieve desired optical and mechanical properties. In multilayer IR reflecting films described herein, the polymeric layers A and B can have sufficient interfacial adhesion to prevent delamination. The polymeric layer B may include a fluoropolymer commercially available from 3M Company (Saint Paul, Minn., USA) under the trade designation THV, which are terpolymers of tetrafluoroethylene, hexafluoropropylene, and vinylidene fluoride. In some embodiments, the polymeric layer B may include four or more monomers, including PPVE, for improved interlayer adhesion with polymeric layer A. The polymeric layer B may preferably include FEP (fluorinated Ethylene Propylene) copolymers and PPVE, which are considered advantageous for their low refractive index and potential for excellent interlayer adhesion.

Fluoropolymers useful as the polymer matrix in optical layer B may include fluorocarbon resins. Fluorinated ethylene-propylene copolymer (i.e., FEP) is defined per ASTM D2116-07 "Standard Specification for FEP-Fluorocarbon Molding and Extrusion Materials". Perfluoroalkoxy resin (i.e., PFA) is defined per ASTM D3307-08 "Standard Specification for Perfluoroalkoxy Fluorocarbon Resin Molding and Extrusion Materials". Polymeric materials including tetrafluoroethylene with hexafluoroethylene and/or a vinyl ether, which are outside of the ASTM designations listed above are also contemplated. Representative melt-processable copolymers including interpolymerized monomers of tetrafluoroethylene may include, for example, copolymers of tetrafluoroethylene, hexafluoropropylene, and vinylidene fluoride (e.g., THV); copolymers of tetrafluoroethylene, hexafluoropropylene, and ethylene (e.g., HTE), copolymers of tetrafluoroethylene and norbornene, copolymers of ethylene and tetrafluoroethylene (e.g., ETFE): copolymers of tetrafluoroethylene, hexafluoropropylene, and ethylene (e.g., TFEP); or combinations thereof.

In some embodiments, exemplary fluoropolymers useful as the polymer matrix in layer B include THV available under the trade designation "DYNEON THV 221 Grade", "DYNEON THV 2030 Grade", "DYNEON THV 500 Grade", "DYNEON THV61.0 Grade", "DYNEON THV 815 Grade", and "DYNEON HTEX 1705 Grade", "DYNEON FEP Grade", all available from Dyneon LLC, Oakdale, Minn.

Table 1 below lists interlayer adhesion values (i.e., average delamination force) for the combination of PET/THV as optical layers A and B where layer B of THV is available with various grades A-F. Table 2 below lists interlayer adhesion values (i.e., average delamination force) for the combination of PMMA/THV as layers A and B where layer B of THV is available with various grades A-F. It can be seen in Table 1 that fluoropolymers containing a higher level of VDF (vinylidene fluoride) and or PPY (perfluoropropyl vinylether) may have better interlayer adhesion to PET (polyethylene terephthalate). In some embodiments, it might be desired to have a delamination force of greater than 50 grams/inch to prevent delamination during cutting and application of the film. In general, the combination of PMMA/THV may exhibit greater interlayer adhesion than the combination of PET/THV, while the combination of PET/THV may exhibit greater optical power (e.g., reflectivity) with the same number of optical layers since its greater refractive index difference. Some grades of THV may have greater interlayer adhesion with PET or PMMA than others.

TABLE 1

| THV Grade | TFE (mol %) | HFP (mol %) | VDF (mol %) | PPVE (mol %) | Delamination Force (grams/inch) |
|---|---|---|---|---|---|
| A | 46.5 | 16.5 | 35.5 | 1.5 | 83 |
| B | 39 | 11 | 50 | 0 | 82 |
| C | 51.5 | 13 | 35.5 | 0 | 30 |
| D | 55.5 | 12 | 32.5 | 0 | 17 |
| E | 61 | 10.5 | 28.5 | 0 | 30 |
| F | 72.5 | 7 | 19 | 1.5 | 27 |

TABLE 2

| THV Grade | TFE (mol %) | HFP (mol %) | VDF (mol %) | PPVE (mol %) | Delamination Force (grams/inch) |
|---|---|---|---|---|---|
| A | 46.5 | 16.5 | 35.5 | 1.5 | 352 |
| B | 39 | 11 | 50 | 0 | 274 |
| C | 51.5 | 13 | 35.5 | 0 | 93 |
| D | 55.5 | 12 | 32.5 | 0 | 80 |
| E | 61 | 10.5 | 28.5 | 0 | 65 |
| F | 72.5 | 7 | 19 | 1.5 | 171 |

Figure 2:
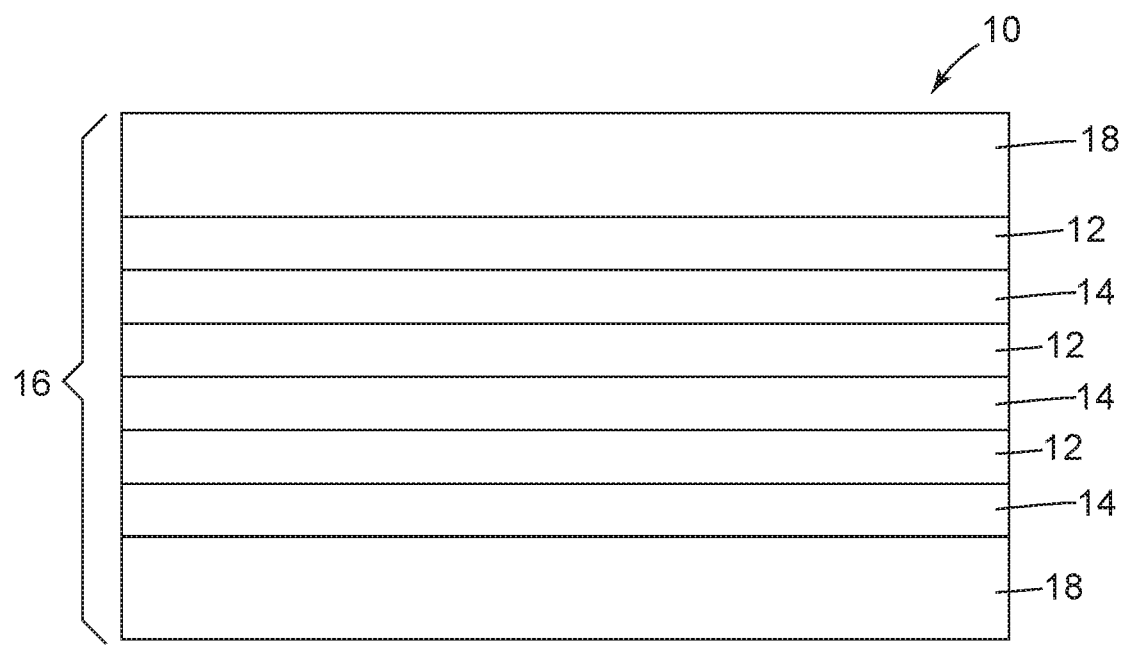
FIG. 2 shows a schematic illustration of an ABAB layer construction for use in a multilayer IR reflecting film, according to another embodiment.

FIG. 2 is a schematic illustration of a multilayer optical body 10 for use in a multilayer IR reflecting film, according to another embodiment. In FIG. 2, the optical multilayer optical body 10 includes multiple optical repeating units, i.e., alternating pairs of optical layer A 12 and optical layer B 14. The optical layers 12 and 14 are typically interleaved to form a stack 16 of layers, optionally, with one or more of non-optical layers 18 disposed on a surface of the stack 16 as a skin layer. In some embodiments, the relative optical thicknesses of the optical layers A and B can be about the wavelength of light intended for the stack 16 to reflect.

The optical layer A has a first in-plane refractive index $n_1$ ($n_x^A$ or $n_y^A$). The optical layer B has a second refractive index $n_2$ ($n_x^B$ or $n_y^B$). In some embodiments, the first in-plane refractive index $n_1$ may be in the range of about 1.62 to about 1.68. In some embodiments, the second in-plane refractive index $n_2$ may be in a range of about 1.34 to about 1.40. In some embodiments, the first in-plane refractive index $n_1$ may be, for example, about 0.26 to about 0.32 greater that the second in-plane refractive index $n_2$. Preferred materials for optical layers A and B in FIG. 2 can be the same as in the optical repeating unit 100 of FIG. 1.

In some embodiments, the layer thickness profile (layer thickness values) of multi-layer optical film described herein reflecting at least 50 percent of incident IR light over a specified wavelength range can be adjusted to be approximately a linear profile with the first (thinnest) optical layers adjusted to, for example, have about a ¼ wave optical thickness (index times physical thickness) for 200 nm light and progressing to the thickest layers which would be adjusted to be about ¼ wave thick optical thickness for 450 nm light.

Some embodiments of multi-layer optical films described herein may have an IR transmission band edge in a range from 10 to 90 percent transmission spanning less than 20 nanometers, or less than 10 nanometers in some embodiments.

While FIGS. 1 and 2 provide two exemplary configurations of a multilayer IR reflecting film, it is to be understood that multilayer IR reflecting films described herein may have other suitable configurations where an optical repeating unit includes the high refractive index polymeric layer A, and the low refractive index polymeric layer B. For example, some multilayer IR reflecting films may include an optical repeating unit having optical polymeric layers A, B and C arranged in an order ABCB. Exemplary optical films with an ABCB layer construction was described in U.S. Pat. No. 6,667,095 (Wheatley et al.), which is incorporated herein by reference.

In the present disclosure, the number of optical repeating units in a multilayer IR reflecting film may vary, for example, from several tens to several thousands, depending on the desired application of the film. In some embodiments, the number of layers in the reflective films and other optical devices made in accordance with the present disclosure can be selected to achieve the desired optical properties using the minimum number of layers for reasons of film thickness, flexibility and economy. In some cases, the number of layers in the multilayer IR reflecting films described herein is preferably less than about 10,000, more preferably less than about 5.000, and most preferably, less than about 2,000. In some cases, when a thin multilayer IR reflecting film is desired, the number of layers may be less than about 2,000, less than 1,000, less than 700, less than 500, or less than 400.

The multilayer IR reflecting films described herein can provide a broadened reflection band, e.g., in a near infrared wavelength range of about 8.50 nm to about 1850 nm. In some embodiments, the films may have an average reflectance from about 50% to about 100% in a near infrared wavelength range of about 850 nm to about 1850 nm. In addition, the films can be visible transparent. In some embodiments, the films may have an average transmission of about 70% to about 90% in a visible light range.

In some embodiments, the multilayer IR reflecting films described herein can exhibit low CIE (L*, a*, b*) color values, for example, with $-8.0<a^*<8.0$ and $-8.0<b^*<8.0$, with $-5.0<a^*<5.0$ and $-5.04)^*<5.0$, with $3.0<b<3.0$ and $-3.0<b^*<3.0$, with $2.0<a^*<2.0$ and $-2.0<b^*<2.0$, or with $1.0<a^*<1.0$ and $-1.0<b^*<1.0$. In some embodiments, the absolute value of at least one of a* and b* may be lower than 8, lower than 5, lower than 3, lower than 2, or lower than 1. CIE colors L*a*b* can be calculated using CIE methodology (ASTM E305) on spectral data generated with the 4×4 Berreman Matrix Method optical modeling. Solar weighting functions using Air Mass 1.5 can be used for solar calculations. In this color space, L* indicates lightness and a*b* are the chromaticity coordinates. High L* is white and low L* is black. Positive a* is red and negative a* is green. Positive b* is yellow and negative h* is blue. The center is achromatic with $a^*=0$ and $b^*=0$. As a* and h* move further from 0, the color saturation increases.

In addition to optical layers such as layers A and B in FIGS. 1 and 2, the multilayer reflective films described herein may include one or more non-optical layers. Non-optical layer is used herein to refer to an optically thick layer. An optically thick layer refers to a layer whose optical thickness is at least about ten wavelengths of light in the spectral region of interest. For example, one or more skin layers may be applied on the exterior surfaces of the film construction, or one or more interior non-optical layers, such as protective boundary layers, may be inserted between packets of layers that form the unit cells. Non-optical layers give the multilayer film structure or protect it from harm or damage during or after processing. Typically, one or more of the non-optical layers are placed so that at least a portion of the light to be transmitted, polarized, or reflected by the individual layers making up the unit cells also travels through the non-optical layers (e.g., these layers are placed in the path of light which travels through or is reflected by the first and second optical layers). The non-optical layers may be of any appropriate material and can be the same as one of the materials used in the optical stack. For purposes of setting limits or bounds on an optical packet or effective optical packet, an optically thick or even semi-infinite layer of air or vacuum can also be considered a non-optical layer.

For some applications, it might be desirable to use visible and infrared absorbing pigments or dyes to lower the visible light transmission and further reduce the solar heat gain coefficient (SHGC). In some embodiments, the visible light transmission can be reduced from about 90% to about 70% by using visible and infrared absorbing pigments or dyes. The pigments and/or dyes can be added to optical layers and/or non-optical layers (e.g., skin layers) of the multilayer IR reflecting films, in some embodiments, suitable one or more absorbing dyes or pigments can be provided to absorb at least one of infrared light in the wavelength range of 850 nm to 1850 nm and near-infrared light in the wavelength range of 750 nm to 850 nm.

In some embodiments, infrared absorbing pigments/dyes can be added to a skin layer below the infrared reflecting optical layers or in an adhesive layer below the infrared reflecting film. Visible and infrared absorbing pigments/dyes may also be incorporated into a glass, a polymeric sheet, or a substrate below the infrared reflecting film. Optical modeling indicates that a single packet infrared reflective mirror as shown in FIG. 1 can have visible light transmission of about 84% when laminated to clear glass with a Solar Heat Gain Coefficient (SHGC) of 0.57. In the present disclosure, SHGC is the measurement of a film's ability to block radiant energy from the sun. It is the fraction of solar radiation admitted through a film, e.g., a window film. It is expressed as a number between 0 and 1. The lower a window's solar heat gain coefficient, the less solar heat it transmits, and the greater its shading ability. In some embodiments, the films described herein can have a solar heat gain coefficient (SHGC) in a range of, for example, about 0.2 to about 0.7, about 0.3 to about 0.6, or about 0.3 to about 0.5. When the film shown in FIG. 1 is laminated to a green glass, optical modeling indicates the visible light transmission to be 76% and the SHGC to be 0.49. The values of SHGC described herein were determined based on ASTM C1199-14 "Standard Test Method for Measuring the Steady-State Thermal Transmittance of Fenestration Systems Using Hot Box Methods."

Suitable visible and infrared absorbing pigments may include metal oxides such as, for example, antimony tin oxide, indium tin oxide, cesium oxides, iron oxides, and cuprous oxides. Additional infrared absorbing pigments may include squaraines such as hydroxyl squaraine, and metal phthalocyanines such as vanadyl phthalocyanine, chloroindium phthalocyanine, titanyl phthalocyanine, chloroaluminum phthalocyanine, copper phthalocyanine, and magnesium phthalocyanine. Particularly useful infrared pigments may include complexes of tungsten oxides. Even carbon black reduced to nanoparticle size and well dispersed in the bottom polymer skin layer, or in an applied coating, can be useful for reducing the SHGC in the described film while maintaining the visible light transmission greater than 70%.

The multilayer IR reflecting films have superior solar heat rejection performance while maintaining high visible light transmission. In some cases, this is achieved by utilizing fluoropolymer low refractive index polymer in combination with higher order harmonic suppressive optical designs. In some embodiments, the films can reflect 50-100% more near infrared energy with 70-90% visible light transmission and minimal color non-uniformity. In some embodiments, when used in combination with green glass and/or dyes/pigments, the films can achieve solar heat gain coefficients below 0.5 while maintaining visible light transmission greater than 70%. The multilayer IR reflecting films described herein can be electrically insulative and capable of transmitting radio frequency electromagnetic radiation. The films may not include metal layers or coatings that may block wireless communication.

The multilayer IR reflecting films described herein can be made by suitable processes such as, for example, multilayer extrusion processes. It is to be understood that the polymers of the films may have compatible rheologies to facilitate coextrusion. For example, the melt viscosities of the polymers can be substantially matched to prevent layer instability or non-uniformity. The selection of polymeric materials in the present disclosure can also provide sufficient interfacial adhesion to prevent possible film delamination.

In some embodiments, multilayer optical films described herein can be made using the general processing techniques, such as those described in U.S. Pat. No. 6,783,349 (Neavin et al.), the disclosure of which is incorporated herein by reference.

Desirable techniques for providing a multilayer optical film with a controlled spectrum may include, for example, 1) the use of an axial rod heater control of the layer thickness values of coextruded polymer layers as described, for example, in U.S. Pat. No. 6,783,349 (Neavin et al.); 2) timely layer thickness profile feedback during production from a layer thickness measurement tool such as, for example, an atomic force microscope (AFM), a transmission electron microscope, or a scanning electron microscope; 3) optical modeling to generate the desired layer thickness profile; and 4) repeating axial rod adjustments based on the difference between the measured layer profile and the desired layer profile.

In some embodiments, the basic process for layer thickness profile control may involve adjustment of axial rod zone power settings based on the difference of the target layer thickness profile and the measured layer profile. The axial rod power increase needed to adjust the layer thickness values in a given feedblock zone may first be calibrated in terms of watts of heat input per nanometer of resulting thickness change of the layers generated in that heater zone. For example, fine control of the spectrum is possible using 24 axial rod zones for 275 layers. Once calibrated, the necessary power adjustments can be calculated once given a target profile and a measured profile. The procedure is repeated until the two profiles converge.

The multilayer IR reflecting films of this disclosure can be incorporated into a wide variety of commercial articles to impart IR reflectivity and visual transparence to the commercial articles. For example, the films can be provided for a major surface of a window, e.g., a vehicle windshield, a building window, etc. The films can also be provided for an exterior surface of an object such as for example, a vehicle, a building, etc. The IR reflecting films described herein can also be useful in solar energy concentrating designs where it is desirable to transmit visible light for day lighting or to photovoltaic cells which make use of visible light. In some embodiments, the IR reflecting film can be provided on a major surface of a solar energy device component to receive incident sunlight. A solar energy device described herein is a device that can convert electromagnetic energy from the sun (i.e., sunlight) into electricity or thermal energy for use elsewhere. Exemplary solar energy devices using a visible light-transmitting reflector were described in WO 2015/002776 (Herbrink et al.), which is incorporated herein by reference. In some embodiments, the IR reflecting film described herein can be flexible and shaped into various shapes to achieve desired functions. For example, the flexible IR reflecting films can also be configured to reflect and/or concentrate infrared solar energy onto a solar thermal absorbing device, while transmitting visible light into a building for daylighting or transmitting visible light onto photovoltaic cell for electricity generation:

Listing of Exemplary Embodiments

Embodiment 1 is a multilayer infrared (IR) reflecting film comprising:
an optical repeating unit comprising a plurality of polymeric layers arranged to reflect light by constructive and destructive interference, the plurality of polymeric layers including optical layers A and B, the optical layer A being a high refractive index polymeric layer, and the optical layer B being a low refractive index isotropic polymeric layer comprising one or more fluoropolymers,
wherein the film has an average reflectance from about 50% to about 100% in a near infrared wavelength range of about 850 nm to about 1850 nm,
wherein the film has an average transmission from about 70% to about 90% in a visible light range, and
wherein the optical layer A absorbs less than 1% light in an ultraviolet (UV) wavelength range of about 350 nm to about 400 nm.

Embodiment 2 is the film of embodiment 1, wherein the optical layer B comprises about 30 mol % to about 80 mol % of tetrafluoroethylene (TFE), and about 20 mol % to about 70 mol % of hexafluoropropylene (HFP).

Embodiment 3 is the film of embodiment 2, wherein the optical layer B comprises about 30 mol % to about 75 mol % of tetrafluoroethylene (TFE), about 5 mol % to about 30 mol % of hexafluoropropylene (HFP), less than about 55 mol % of vinylidene fluoride (VDF), and less than about 15 mol % of perfluoropropylvinyl ether (PPVE).

Embodiment 4 is the film of embodiment 2, wherein the optical layer B comprises about 35 mol % to about 80 mol % of tetrafluoroethylene (TFE), about 5 mol % to about 50 mol % of hexafluoropropylene (HFP), and less than about 15 mol % of perfluoropropylvinyl ether (PPVE).

Embodiment 5 is the film of any one of embodiments 1-4, wherein the optical layer A comprises polyester.

Embodiment 6 is the film of any one of embodiments 1-5, wherein the optical layer A comprises polyethylene terephthalate (PET).

Embodiment 7 is the film of any one of embodiments 1-6, wherein the optical layer A comprises polymethylmethacrylate (PMMA).

Embodiment 8 is the film of any one of embodiments 1-7, wherein the plurality of polymeric layers of the optical repeating unit are arranged in an order ABABAB with the thickness ratio of about 7:1:1:7:1:1.

Embodiment 9 is the film of any one of embodiments 1-8, wherein an in-plane refractive index of the optical layer A is about 0.26 to about 0.32 greater than an in-plane refractive index of the optical layer A.

Embodiment 10 is the film of any one of embodiments 1-9, wherein the polymeric layer B has an in-plane refractive index in a range of about 1.34 to about 1.40.

Embodiment 11 is the film of any one of embodiments 1-10, wherein the polymeric layer A has a refractive index in a range of about 1.62 to about 1.68.

Embodiment 12 is the film of any one of embodiments 1-11, wherein the film has CIE (L*, a*, b*) color coordinates with −5.0<a*<5.0 and −5.0<b*<5.0.

Embodiment 13 is the film of any one of embodiments 1-12 further comprises one or more absorbing dyes or pigments capable of absorbing at least one of infrared light in the wavelength range of 850 nm to 1850 nm and near-infrared light in the wavelength range of 750 nm to 850 nm.

Embodiment 14 is the film of embodiment 13, wherein the absorbing dyes or pigments are added into the optical repeating unit or a skin layer.

Embodiment 15 is the film of any one of embodiments 1-14, wherein the film has a solar heat gain coefficient in a range of about 0.3 to about 0.5.

Embodiment 16 is the film of any one of embodiments 1-15, which is electrically insulative and capable of transmitting radio frequency electromagnetic radiation.

Embodiment 17 is a window having a major surface, wherein the film of any preceding embodiments is provided on the major surface.

Embodiment 18 is the window of embodiment 17, which is a vehicle windshield.

Embodiment 19 is the window of embodiment 17, which is a building window.

Embodiment 20. An article covering an exterior surface of an object, the article comprising the film of any preceding embodiments.

Embodiment 21 is the article of embodiment 20, wherein the object includes a vehicle or a building.

Embodiment 22 is a solar energy device component comprising the film of any one of embodiments 1-16, the film being disposed on a major surface of the solar energy device component to receive incident light.

Embodiment 23 is a solar energy device component comprising the film of any one of embodiments 1-16, the film being configured to reflect and concentrate incident infrared solar energy onto a solar thermal energy device.

EXAMPLES

These examples are merely for illustrative purposes and are not meant to be limiting on the scope of the appended claims.

Computer-Simulation Method

The 4×4 matrix method using the Berreman algorithm was used for modeling the spectra of constructive and destructive interference generated from layer interfaces of materials having different refractive indices. The Berreman 4×4 matrix methodology was described in the Journal of the Optical Society of America (Volume 62, Number 4, April 1972) and the Journal of Applied Physics (Volume 85. Number 6, March 1999), Input parameters for this optical model were individual polymer refractive indices, polymer layer thicknesses, number of polymer layers, and reflection bandwidth including a left band edge and a right band edge. The Berreman methodology calculates the percent light reflected at each layer interface and the percent light transmitted at each layer interface and outputs a reflection spectra and transmission spectra. The Berreman methodology can also be used to calculate a color response from the spectral output. Color response is quantified in terms of the well-known CIE (L*, a*, b*) color coordinates. Standard practices for computing color using the CIE system are described in ASTM E-308.

Example 1 and Comparative Example 1

Multilayer IR reflecting films with an alternating AB construction were simulated via the computer-simulation method described above.

Figure 3:
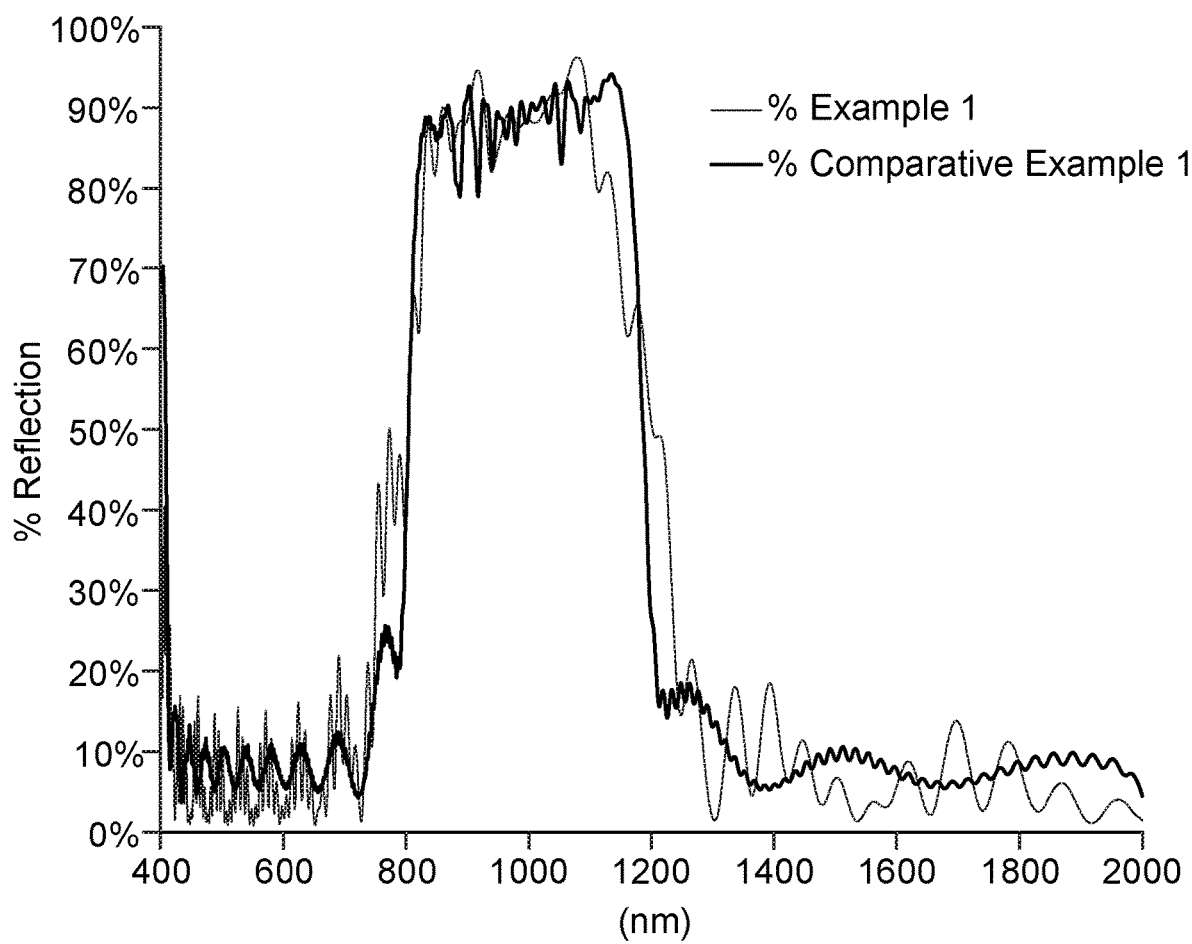
FIG. 3 shows computed reflection spectra for Example 1 and Comparative Example 1.
Figure 4:
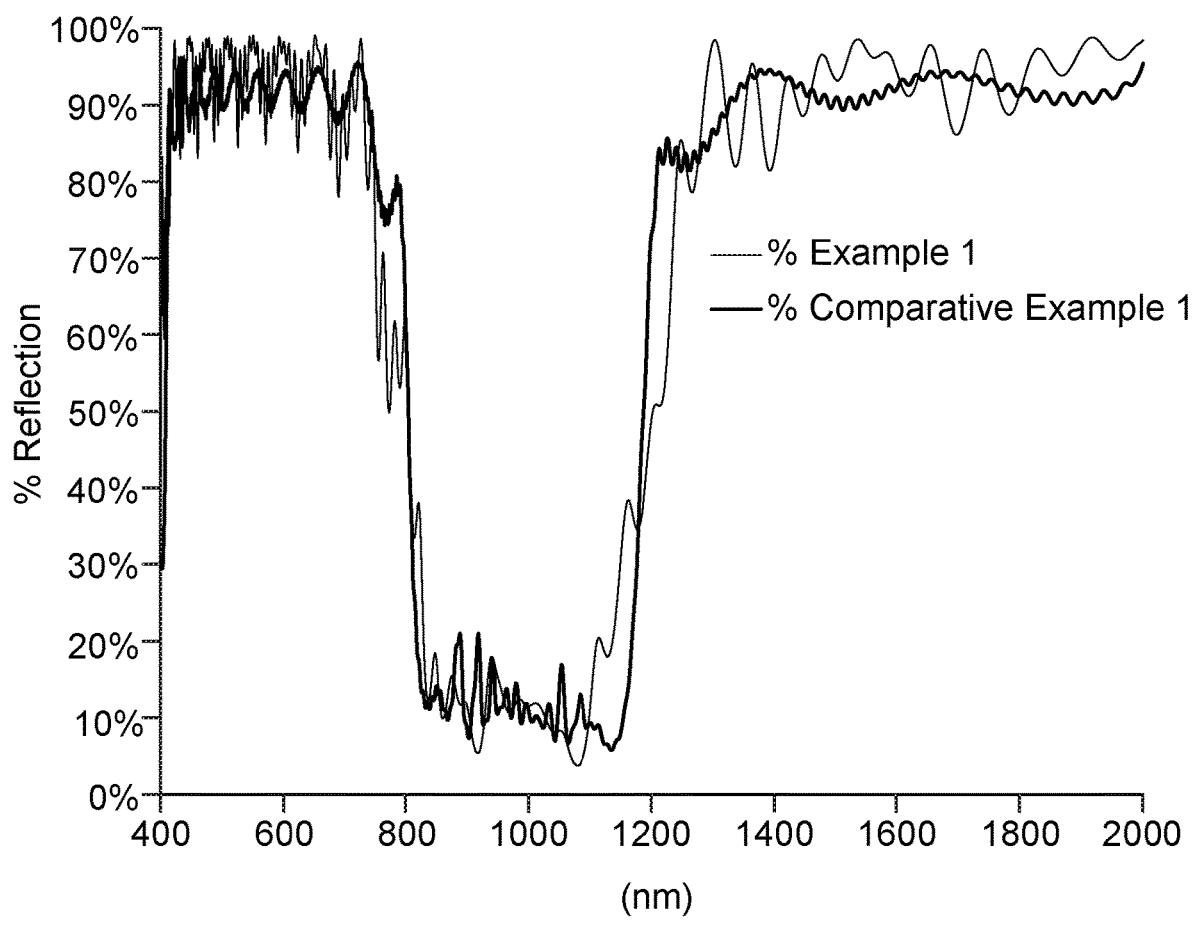
FIG. 4 shows computed transmission spectra for Example 1 and Comparative Example 1.

In Example 1, an optical model described as the 4×4 transfer matrix method using the Berreman algorithm was used to model a ¼ wave constructive interference stack having 50 alternating optical layers (25 optical repeating units) of PET (polyethylene terephthalate) as polymer A and THV7221 (available from 3M Dyneon, Oakdale, Minn.) as polymer B. As seen in FIG. 3, the optical modeling predicts average reflectivity of 88% over a reflection band of 850 nm to 1150 nm. As seen in FIG. 4, the optical modeling predicts average visible light transmission of 92% over a light transmission band of 400 nm to 750 nm.

In Comparative Example 1, an optical model described as the 4×4 transfer matrix method using the Berreman algorithm was used to model a ¼ wave constructive interference stack having 200 alternating optical layers (100 optical repeating units) of PET (polyethylene terephthalate) as polymer A and CoPMMA (available under the tradename Altuglas 510A from Arkema, Prussia, Pa.) as polymer B. As seen in FIG. 3, the optical modeling predicts average reflectivity of 89% over a reflection band of 850 nm to 1150 nm. As seen in FIG. 4, the optical modeling predicts average visible light transmission of 90% over a light transmission band of 400 nm to 750 nm.

Example 1 and Comparative Example 1 exhibited comparable optical powers (e.g., similar reflectivity and transmissions). But Comparative Example 1 utilized much more optical layers (i.e., 100 units in Comparative Example 1 versus 25 units in Example 1), and thus had much greater thickness. The advantage of Example 1 to be thinner may be attributed to the greater difference of refractive indices for the adjacent optical layers A and B (PET/THV) in Example 1 than that for PET/CoPMMA in Comparative Example 1.

Example 2 and Comparative Examples 2A and 2B

A multilayer IR reflecting film with a 711 construction of FIG. 1 was simulated via the computer-simulation method described above.

Figure 5:
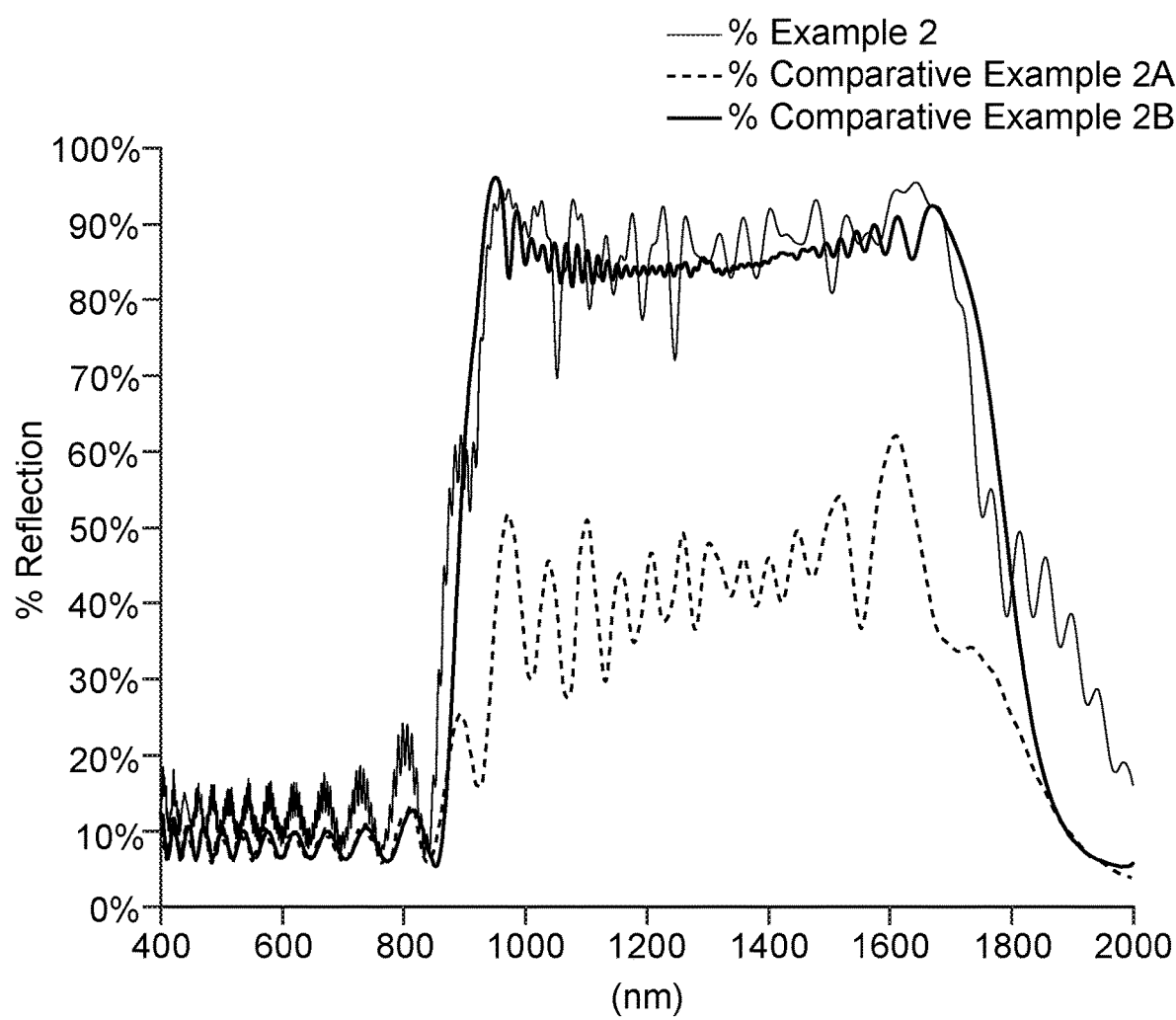
FIG. 5 shows computed reflection spectra for Example 2 and Comparative Examples 2A and 2B.
Figure 6:
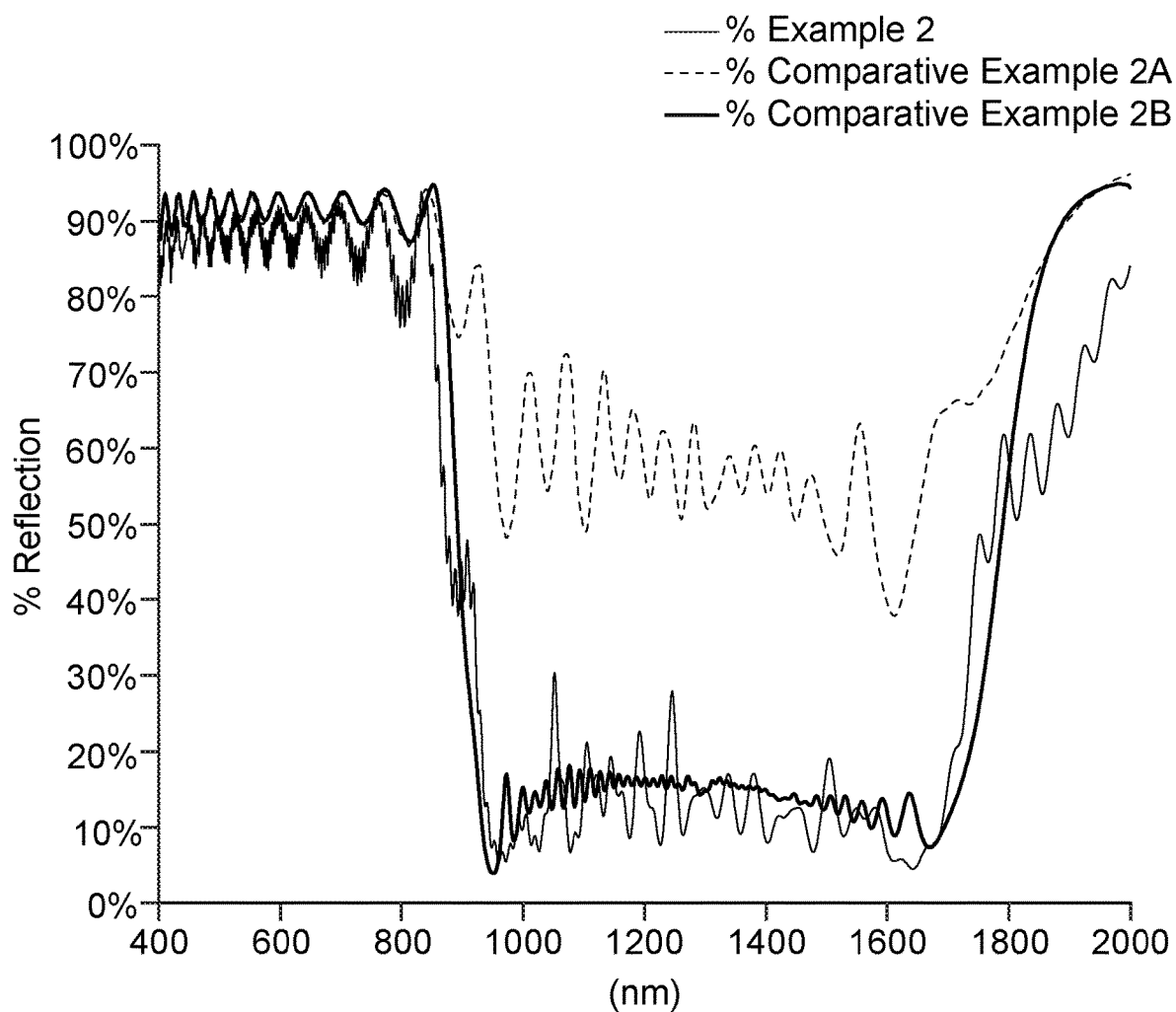
FIG. 6 shows computed transmission spectra for Example 2 and Comparative Examples 2A and 2B.

In Example 2, an optical model described as the 4×4 transfer matrix method using the Berreman algorithm was used to model a 711 constructive interference stack having 330 alternating optical layers (55 optical repeating units) of PET (polyethylene terephthalate) as polymer A and THV221 (available from 3M Dyneon, Oakdale, Minn.) as polymer B. As seen in FIG. 5, the optical modeling predicts average reflectivity of 82% over a reflection band of 850 nm to 1850 nm. As seen in FIG. 6, the optical modeling predicts average visible light transmission of 88% over a light transmission band of 400 nm to 750 nm.

In Comparative Example 2A, an optical model described as the 4×4 transfer matrix method using the Berreman algorithm was used to model a 711 constructive interference stack having 330 alternating optical layers (55 optical repeating units) of PET (polyethylene terephthalate) as polymer A and CoPMMA (available under the tradename Altuglas 510A from Arkema, Prussia, Pa.) as polymer B. As seen in FIG. 5, the optical modeling predicts average reflectivity of about 45% over a reflection band of 850 nm to 1850 nm. As seen in FIG. 6, the optical modeling predicts average visible light transmission of 92% over a light transmission band of 400 nm to 750 nm. Transmitted CIE color chromacity values were calculated to be a*=−0.036 and b*=0.208. Reflected CIE color chromacity values were calculated to be a*=0.174 and b*=−0.769.

In Comparative Example 2B, an optical model described as the 4×4 transfer matrix method using the Berreman algorithm was used to model a 711 constructive interference stack having 1290 alternating optical layers (215 optical repeating units) of PET (polyethylene terephthalate) as Polymer A and CoPMMA (available under the tradename Altuglas 510A from Arkema, Prussia, Pa.) as Polymer B. As seen in FIG. 5, the optical modeling predicts average reflectivity of 79% over a reflection band of 850 nm to 1850 nm. As seen in FIG. 6, the optical modeling predicts average visible light transmission of 91% over a light transmission band of 400 nm to 750 nm, Transmitted CIE color chromacity values were calculated to be a*=−0.082 and b*=0.382. Reflected CIE color chromacity values were calculated to be a*=0.334 and b*=−1.382.

Example 2 and Comparative Example 2A have the same number of optical layers. Example 2 exhibited superior optical properties (e.g., higher reflectivity over the reflection band of 850 nm to 1850 nm). Example 2 and Comparative Example 2B exhibited comparable optical power (e.g., similar reflectivity). But Comparative Example 2 utilized much more optical layers 215 units in Comparative Example 2B versus 55 units in Example 2), and thus had much greater thickness. The advantage of Example 2 to be thinner is attributed to the greater difference of refractive indices for the adjacent layers A and B (PET/THV) in Example 2 than that for PET/CoPMMA in Comparative Example 2B.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, various exemplary embodiments have been described. These and other embodiments are within the scope of the following claims.

What is claimed is:

1. A multilayer infrared (IR) reflecting film comprising:
an optical repeating unit comprising a plurality of polymeric layers arranged to reflect light by constructive and destructive interference, the plurality of optical polymeric layers including optical layers A and B, the optical layer A being a high refractive index polymeric layer, and the optical layer B being a low refractive index isotropic polymeric layer comprising one or more fluoropolymers comprising tetrafluoroethylene (TFE) and hexafluoropropylene (HFP),
wherein the plurality of polymeric layers of the optical repeating unit are arranged in an order ABABAB with the thickness ratio of about 7:1:1:7:1:1,
wherein the film has an average reflectance from about 82% to about 100% in an entire near infrared wavelength range of about 850 nm to about 1850 nm,
wherein the film has an average transmission from about 70% to about 90% in a visible light range, and
wherein the optical layer A absorbs less than 1% light in an ultraviolet (UV) wavelength range of about 350 nm to about 400 nm.

2. The film of claim 1, wherein the optical layer B comprises about 30 mol % to about 80 mol % of tetrafluoroethylene (TFE), and about 20 mol % to about 70 mol % of hexafluoropropylene (HFP).

3. The film of claim 1, wherein the optical layer B comprises about 30 mol % to about 75 mol % of tetrafluoroethylene (TFE), 5 mol % to about 30 mol % of hexafluoropropylene (HFP), less than about 55 mol % of vinylidene fluoride (VDF), and less than about 15 mol % of perfluoropropylvinyl ether (PPVE).

4. The film of claim 1, wherein the optical layer B comprises about 35 mol % to about 80 mol % of tetrafluoroethylene (TFE), about 5 mol % to about 50 mol % of hexafluoropropylene (HFP), and less than about 15 mol % of perfluoropropylvinyl ether (PPVE).

5. The film of claim 1, wherein the optical layer A comprises polyester.

6. The film of claim 1, wherein the optical layer A comprises polyethylene terephthalate (PET).

7. The film of claim 1, wherein the optical layer A comprises polymethylmethacrylate (PMMA).

8. The film of claim 1, wherein an in-plane refractive index of the optical layer A is about 0.26 to about 0.32 greater than an in-plane refractive index of the optical layer B.

9. The film of claim 1, wherein the polymeric layer B has an in-plane refractive index in a range of about 1.34 to about 1.40.

10. The film of claim 1, wherein the polymeric layer A has an in-plane refractive index in a range of about 1.62 to about 1.68.

11. The film of claim 1, wherein the film has CIE (L*, a*, b*) color coordinates with −5.0<a*<5.0 and −5.0<b*<5.0.

12. The film of claim 1 further comprises one or more absorbing dyes or pigments capable of absorbing at least one of infrared light in the wavelength range of 850 nm to 1850 nm and near-infrared light in the wavelength range of 750 nm to 850 nm.

13. The film of claim 1, wherein the film has a solar heat gain coefficient in a range of about 0.3 to about 0.5.

14. A window having a major surface, wherein the film of claim 1 is provided on the major surface.

* * * * *